United States Patent
Rittweger

(10) Patent No.: US 11,254,168 B2
(45) Date of Patent: Feb. 22, 2022

(54) VEHICLE TIRE

(71) Applicant: Continental Reifen Deutschland GmbH, Hannover (DE)

(72) Inventor: Stefan Rittweger, Garbsen (DE)

(73) Assignee: Continental Reifen Deutschland GmbH, Hannover (DE)

( * ) Notice: Subject to any disclaimer, the term of this patent is extended or adjusted under 35 U.S.C. 154(b) by 238 days.

(21) Appl. No.: 16/319,763

(22) PCT Filed: May 18, 2017

(86) PCT No.: PCT/EP2017/061917
§ 371 (c)(1),
(2) Date: Jan. 22, 2019

(87) PCT Pub. No.: WO2018/015044
PCT Pub. Date: Jan. 25, 2018

(65) Prior Publication Data
US 2019/0275844 A1 Sep. 12, 2019

(30) Foreign Application Priority Data
Jul. 21, 2016 (DE) ...................... 10 2016 213 334.9

(51) Int. Cl.
*B60C 11/13* (2006.01)
*B60C 11/03* (2006.01)

(52) U.S. Cl.
CPC .............. *B60C 11/13* (2013.01); *B60C 11/03* (2013.01); *B60C 11/0304* (2013.01);
(Continued)

(58) Field of Classification Search
CPC ..... B60C 11/13; B60C 11/03; B60C 11/0304; B60C 2011/0341; B60C 2011/0367;
(Continued)

(56) References Cited

U.S. PATENT DOCUMENTS 8,640,750 B2  2/2014 Kageyama
8,733,411 B2  5/2014 Mukai
(Continued)

FOREIGN PATENT DOCUMENTS

CN  101992658 A  3/2011
CN  104619525  *  5/2015  ............. B60C 11/13
(Continued)

OTHER PUBLICATIONS

International Search Report dated Aug. 9, 2017 of international application PCT/EP2017/061917 on which this application is based.

*Primary Examiner* — Matthew J Daniels
*Assistant Examiner* — Shibin Liang
(74) *Attorney, Agent, or Firm* — Gregory Adams; David L. Cate

(57) ABSTRACT

The tread profile of a vehicle tire has a circumferential rib. Grooves are formed in the circumferential rib with a width, which increases along its entire extent, wherein the grooves are formed with a vertex point between a first portion and a second portion. The groove direction from the beginning to the vertex point is formed with a greater directional component in the circumferential direction than in the axial direction and between the vertex point and the entry into the circumferential groove is formed with a greater directional component in the axial direction than in the circumferential direction. The groove is formed in the first portion with a depth $T_1$, which increases continuously from the beginning over the first portion up to reaching its maximum value $T_{1max}$ at the vertex point and is formed with a constant depth $T_2$ in the second portion wherein $T_2 \geq T_{1max}$.

11 Claims, 5 Drawing Sheets

(52) U.S. Cl.
CPC ......... *B60C 2011/0341* (2013.01); *B60C 2011/0367* (2013.01); *B60C 2011/0369* (2013.01); *B60C 2011/0379* (2013.01); *B60C 2011/0386* (2013.01)

(58) Field of Classification Search
CPC ..... B60C 2011/0369; B60C 2011/0379; B60C 2011/0386
See application file for complete search history.

(56) References Cited

U.S. PATENT DOCUMENTS 10,279,631 B2 * 5/2019 Kubo ................ B60C 11/0306
2017/0008346 A1 1/2017 Kubo

FOREIGN PATENT DOCUMENTS

| | | |
|---|---|---|
| CN | 104619525 A | 5/2015 |
| DE | 10 2012 108 384 A1 | 3/2014 |
| DE | 20 2014 006 967 U1 | 9/2014 |
| EP | 2239153 A1 | 10/2010 |
| EP | 2489526 A2 | 8/2012 |
| EP | 2636544 A1 | 9/2013 |
| JP | 2010030350 * | 2/2010 ............ B60C 11/04 |
| WO | 2014037165 A1 | 3/2014 |
| WO | 2015/111302 A1 | 7/2015 |

* cited by examiner

III-III

IV-IV

V-V

VI-VI

VII-VII

VIII-VIII

VEHICLE TIRE

CROSS REFERENCE TO RELATED APPLICATIONS

This application is the national stage of PCT/EP2017/061917, filed May 18, 2017, designating the United States and claiming priority from German patent application no. 10 2016 213 334.9, filed Jul. 21, 2016, the entire contents of which are incorporated herein by reference.

FIELD OF THE INVENTION

The invention relates to a tread profile of a pneumatic vehicle tire—in particular a pneumatic passenger car tire—with at least one circumferential rib, which is bounded outwardly in the radial direction R by a radially outer surface forming the ground contact surface and in the axial direction A by circumferential grooves, wherein transversely running grooves are formed in the circumferential rib, extending in the axial direction A from a beginning of extent of the groove, formed at an axial distance from the circumferential grooves bounding the circumferential rib, in the direction of a circumferential groove bounding the circumferential rib over a first portion of extent and over a second portion of extent, which adjoins the first portion of extent in the axial direction A, and entering the circumferential groove, wherein the groove is formed with a width b, which is measured in the radially outer surface and increases along its entire extent between the beginning of extent and the circumferential groove, wherein the groove is formed in the course of its extent between the first portion of extent and the second portion of extent with a vertex point, wherein the direction of extent of the groove from the beginning of extent along its extent in the first portion of extent to the vertex point is formed with a greater directional component in the circumferential direction U than in the axial direction A and from the vertex point over the entire second portion of extent up to the entry into the circumferential groove is formed with a greater directional component in the axial direction A than in the circumferential direction.

BACKGROUND OF THE INVENTION

Tread profiles of passenger car tires with circumferential ribs that are axially bounded by circumferential grooves are known. The circumferential ribs allow a great rigidity of the profile in the circumferential and transverse directions, whereby good handling properties are promoted. However, the expulsion of water in the region of the circumferential rib is made more difficult, which encourages aquaplaning effects and poor grip in the wet, especially in the case of passenger car tire profiles with their operating conditions of higher speeds and low load. This may particularly have an effect especially in the case of relatively wide circumferential ribs.

For improved expulsion of water, it is known to additionally form in circumferential ribs of passenger car tires transversely running grooves which extend between an axial position which lies between the two circumferential grooves bounding the circumferential rib in the direction of a circumferential groove and enter the circumferential groove. This makes it possible for water to be taken up in the region of the transverse groove and drained away to the circumferential groove. However, the take-up capacity and the rate of water expulsion are limited. The take-up capacity can be improved somewhat by increasing the size of the transverse groove, with a greater width and greater depth. However, a great width and depth of the transverse grooves reduces the stiffness of the circumferential rib. In order that, when running through the tire footprint, water can be taken up and transported away sufficiently in the region of the rib, the transverse grooves may also be arranged closely one behind the other. However, in the same way as providing a great width and depth of the transverse grooves, the high density of the positioning of the transverse grooves reduces the stiffness of the circumferential rib, and consequently the possible handling properties.

It is known to form circumferential ribs with transversely running grooves that are formed so as to extend from a beginning of extent, formed at a distance from the circumferential grooves, over a first portion of extent up to a vertex point and from the vertex point to the circumferential groove in a second portion of extent, wherein in the first portion of extent the directional component in the circumferential direction is formed greater than the axial direction of extent and in the second portion of extent the circumferential directional component is formed smaller than the axial direction of extent and wherein the width increases along its extent from the beginning of the groove to the circumferential groove. The groove depth of the grooves is substantially constant over their extent. These grooves do allow the formation of a greater length of extent of the individual transversely running groove in the circumferential rib, and consequently a greater take-up capacity of water. However, such grooves with their long extended formation are either provided with a great depth, and consequently with sufficient water take-up capacity, but at the cost of significant losses of stiffness of the circumferential rib, and consequently disadvantages with regard to handling properties, or else they are formed with such small depths that, although the stiffness of the circumferential rib is restricted to a lesser extent, it is at the cost that the water take-up capacity, and consequently aquaplaning properties and wet gripping properties, are also restricted.

DE 20 2014 006 967 U1 discloses for example such formations of the tread profile in the case of pneumatic tires for commercial vehicles in the case of which only low speeds and high loads determine the operating conditions of the tire, in the case of which a correspondingly small groove depth is chosen.

EP2489526B1 discloses a tread profile of a passenger car tire in which transverse grooves made to extend in a straight line in rows of profile blocks are formed, extend through the entire row of profile blocks from circumferential groove to circumferential groove and are formed over their greatest portion of extent with a small depth and small width and only in a short end portion, which enters one circumferential groove, are formed with an increasing width and depth along their extent up to this circumferential groove. Because of a nozzle-like suction effect, the specific formation allows improved expulsion of water from the narrow transverse grooves of a small depth directly into the circumferential groove. The short portions of extent of the widening and deepening of the transverse grooves also only have a slight effect on the circumferential stiffness of the rows of profile blocks and the dry braking properties.

However, such short groove portions only allow limited expulsion of water at circumferential ribs. Greater expulsion of water at circumferential ribs requires either a high density of the arrangement of grooves and/or great widths and depths of grooves in the rib. Both are at the expense of the circumferential and transverse stiffness of the circumferential rib, and consequently impair good handling properties.

SUMMARY OF THE INVENTION

It is an object of the invention to make it possible to easily obtain tread profiles with circumferential ribs in the case of which the conflict of objectives of good water expulsion and sufficiently great stiffness of the circumferential rib to achieve good handling properties at a higher level is made possible.

This object can, for example, be achieved via the formation of a tread profile of a pneumatic vehicle tire—in particular a pneumatic passenger car tire—with at least one circumferential rib, which is bounded outwardly in the radial direction R by a radially outer surface forming the ground contact surface and in the axial direction A by circumferential grooves, wherein transversely running grooves are formed in the circumferential rib, extending in the axial direction A from a beginning of extent of the groove, formed at an axial distance from the circumferential grooves bounding the circumferential rib, in the direction of a circumferential groove bounding the circumferential rib over a first portion of extent and over a second portion of extent, which adjoins the first portion of extent in the axial direction A, and entering the circumferential groove, wherein the groove is formed with a width b, which is measured in the radially outer surface and increases along its entire extent between the beginning of extent and the circumferential groove, wherein the groove is formed in the course of its extent between the first portion of extent and the second portion of extent with a vertex point, wherein the direction of extent of the groove from the beginning of extent along its extent in the first portion of extent to the vertex point is formed with a greater directional component in the circumferential direction U than in the axial direction A and from the vertex point over the entire second portion of extent up to the entry into the circumferential groove is formed with a greater directional component in the axial direction A than in the circumferential direction, according to an embodiment, in which the groove is formed in the first portion of extent with a depth $T_1$, which is formed as increasing continuously from the beginning of extent along the extent over the first portion of extent up to reaching its maximum value $T_{1max}$ at the vertex point and is formed with a constant depth $T_2$ where $T_2 \geq T_{1max}$ in the second portion of extent.

By being formed in this way, it is made possible that the grooves running transversely in the circumferential rib come into effect with a relatively long length of extent, wherein the width of the groove increases along the extent, from the beginning of extent in the circumferential rib to the end of extent at the circumferential groove, and the depth is formed increasingly in the first portion of extent up to the vertex point. Consequently, a suction effect that sucks in the water at an increased flow rate in the same way as with a nozzle, and consequently transports the water with an increased flow rate into the collecting chamber formed in the second portion of extent with a greater depth and greater width than the first portion of extent, can be produced in the first portion of extent, directed substantially in the circumferential direction. The water can be taken up in the large collecting chamber and, because of the still increasing width of the groove, can be drained away well into the circumferential groove. The formation of the first portion of extent with an increasing groove depth and increasing width formed along the extent from the beginning of extent to the vertex point allows the suction effect to be produced over a long circumferential portion in the circumferential rib, without impairing the stiffness of the circumferential rib significantly. The formation of the large effective take-up reservoir in the second portion of extent allows a high take-up capacity of water. In this case, however, its influence on the stiffness of the circumferential rib is likewise limited because of the formation being limited only to the second portion of extent, Consequently, in spite of good, fast draining away of the water with a great take-up capacity, the influence on the stiffness of the circumferential rib can be greatly restricted. In this way, even in the case of passenger car tires with circumferential ribs further improved expulsion of water in the region of the circumferential ribs along with good handling properties can be implemented more easily. The first portions of extent make it possible in this case to drain away water in an accelerated manner over a long portion of circumferential extent of the circumferential rib without greatly impairing the stiffness of the circumferential rib. The great water draining capacity is made possible without increasing the number of transverse grooves in the circumferential rib.

Particularly advantageous is the formation of a vehicle tire according to an embodiment, wherein the groove is formed along its extent toward the circumferential groove following after the second portion of extent with a third portion of extent, which extends up to the circumferential groove, wherein the groove is formed in the third portion of extent with a constant depth $T_3$ where $T_2 > T_3$. This allows an additional stabilization of the circumferential rib with respect to lowering of the blocks and irregular abrasion in the transitional region of the groove to the circumferential groove.

Particularly advantageous is the formation of a vehicle tire according to an embodiment, wherein the groove is formed along its extent in the direction of the circumferential groove in the third portion of extent, following after the second portion of extent, with a v-shaped widened sectional contour in the radially outer surface and with a greater increase in its width than in the second and first portions of extent. This allows a great groove volume for taking up and draining away a greater amount of water and an optimum outflow to be easily provided even in the transitional region with respect to the circumferential groove, in spite of the reduced groove depth.

Particularly advantageous is the formation of a vehicle tire according to an embodiment, wherein the groove is formed as extending in its first portion of extent with a direction of extent that forms an angle of inclination α with the circumferential direction U where $0° \leq \alpha \leq 20°$. This allows good expulsion of surface water to be easily implemented in the first portion of extent without disadvantages with regard to the formation of noise.

Particularly advantageous is the formation of a vehicle tire according to an embodiment, wherein the groove is formed as extending in its portion of extent between the vertex point and the circumferential groove with a direction of extent that forms an angle of inclination β with the axial direction A where $0° \leq \beta \leq 35°$. This transverse orientation allows good traction in the wet and good abrasion characteristics to be easily made possible.

Particularly advantageous is the formation of a vehicle tire according to an embodiment, wherein the groove is formed along its extent in the direction of the circumferential groove in the first and second portions of extent with a v-shaped widened sectional contour in the radially outer surface with a continuously increasing width. This allows a great groove volume for taking up and draining away a greater amount of water and an optimum outflow to be easily provided over the entire range of extent of the groove.

Particularly advantageous is the formation of a vehicle tire according to an embodiment, wherein, at the transition between the first and second portions of extent, the groove base is formed with a step, with an abrupt change in the groove depth from $T_{1max}$ to $T_2$, wherein 0 mm≤($T_2$-$T_{1max}$) ≤3 mm. This provides an easy way of allowing handling properties to be promoted and irregular abrasion to be counteracted.

Particularly advantageous is the formation of a vehicle tire according to an embodiment, wherein grooves that are formed with a constantly aligned circumferential orientation along their extent from the beginning of extent to the circumferential groove are formed in the circumferential rib.

Particularly advantageous is the formation of a vehicle tire according to an embodiment, wherein grooves that are formed with a circumferential orientation changing at the vertex point along their extent from the beginning of extent to the circumferential groove are formed in the circumferential rib.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
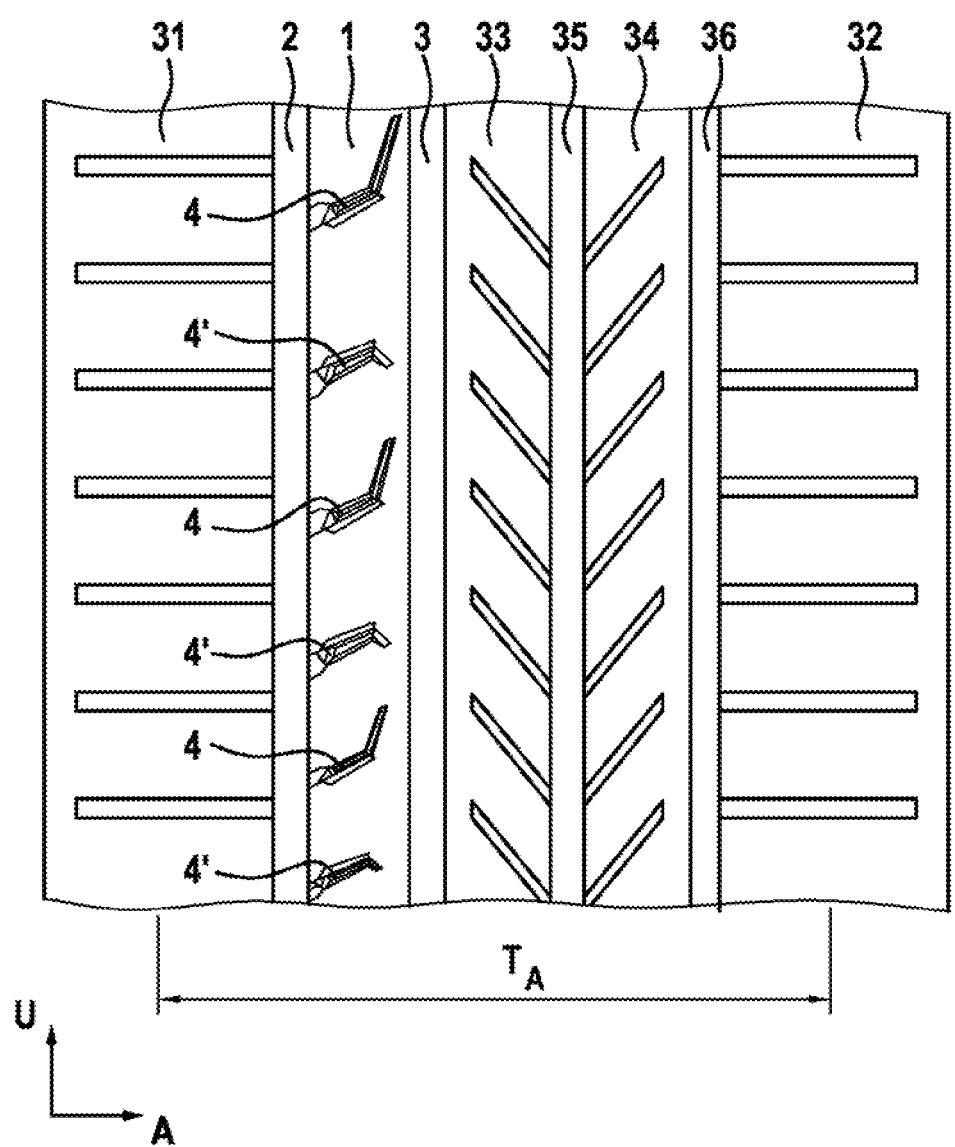
FIG. 1 shows a circumferential portion of a tread profile of a passenger car tire in plan view.

FIG. 1 shows a tread profile of a pneumatic vehicle tire of a passenger car in which, in a conventional way, a number of radially raised profile bands which respectively extend over the entire circumference of the pneumatic vehicle tire and are aligned in the circumferential direction U are arranged next to one another in the axial direction A of the pneumatic vehicle tire. In this case, a profile band 31 or 32 is respectively arranged in each of the two tire shoulders and profile bands formed as circumferential ribs 1, 33 and 34 are arranged axially between the two tire shoulders. The two profile bands 31 and 32 are for example rows of profile blocks of a known kind, in the case of which profile block elements arranged one behind the other in the circumferential direction are respectively separated from one another in the circumferential direction U by transversely running transverse grooves. The circumferential ribs 1, 33 and 34 are circumferential ribs of a known kind, which extend over the entire circumference of the pneumatic vehicle tire and are aligned in the circumferential direction U. The circumferential rib 1 is axially separated from the row of profile blocks 31 in a known way by a circumferential groove 2 that is made to extend over the entire circumference of the pneumatic vehicle tire and is aligned in the circumferential direction U of the pneumatic vehicle tire. The circumferential rib 1 is separated axially from the circumferential rib 33 by a circumferential groove 3. The circumferential rib 33 is separated axially from the circumferential rib 34 by a circumferential groove 35. The circumferential rib 34 is separated axially from the row of profile blocks 32 by a circumferential groove 36 of a known kind. The ground contact width $T_A$ extends in the axial direction A from the region of axial extent of the row of shoulder profile blocks 31 formed in the left-hand shoulder into the axial region of extent of the row of profile blocks 32 formed in the right-hand shoulder.

The rows of profile blocks 31 and 32 and also the circumferential ribs 1, 33 and 34 are bounded outwardly in the radial direction R of the pneumatic vehicle tire by a radially outer surface 9 forming the ground contact surface within the ground contact width $T_A$. The circumferential grooves 2, 3, 35 and 36 are bounded inwardly in the radial direction R in a known way by a groove base which extends over the entire circumference of the pneumatic vehicle tire.

Transverse grooves 4 are formed in the circumferential rib 1, spaced apart from one another in the circumferential direction U of the pneumatic vehicle tire and distributed over the circumference of the pneumatic vehicle tire. The transverse grooves 4 extend in this case in the axial direction A from a position measured at the distance K from the circumferential groove 3 in the radially outer surface 9 to the circumferential groove 2 and enter it.

The circumferential grooves 2 and 3 are formed along their extent with a maximum profile depth $P_T$, measured inwardly in the radial direction R.

Figure 2:
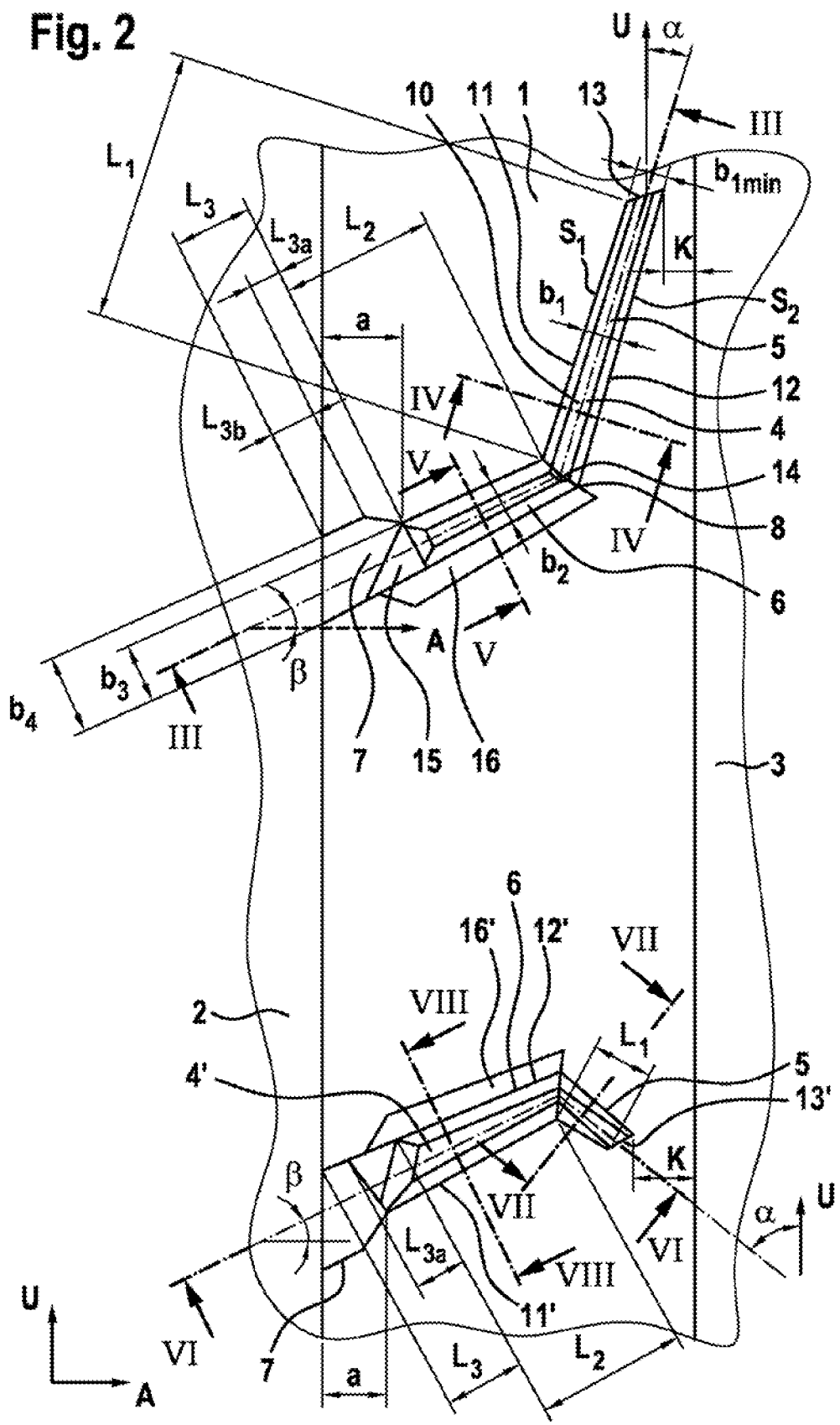
FIG. 2 shows an enlarged portion of a circumferential rib of the tread profile from FIG. 1 in plan view.

As represented in FIGS. 2 to 5, the transverse grooves 4 are bounded inwardly in the radial direction R by a groove base 10 and in the circumferential direction U on one side—represented in FIG. 2 above the groove base 10—by a groove wall 11 arranged after the groove base 10 in the circumferential direction U and in the circumferential direction U on the other side—represented in FIG. 2 under the groove base 10—by a groove wall 12 arranged before the groove base 10 in the circumferential direction U. The transverse groove 4 is bounded along its extent at the end of its extent pointing away from the circumferential groove 2 by a groove wall 13. Here, the groove walls 11, 12 and 13 extend in each case in the radial direction R from the groove base 10 of the groove 4 to the radially outer surface 9.

As can be seen in FIG. 2, the transverse groove 4 is formed from the beginning of its extent, formed in the groove wall 13, with three portions of extent 5, 6 and 7, formed one behind the other, along its extent up to the circumferential groove 2. The groove 4 is in this case formed in its first portion of extent 5, which extends from the position of the beginning of extent in the groove wall 13 to a vertex point 8 in the course of the groove 4, in a straight line while forming an angle of inclination α with the circumferential direction U. Following after the vertex point 8, the transverse groove 4 is formed in a second portion of extent 6 in a straight line and in the extension thereof in a straight line is formed in a third portion of extent 7 as extending in a straight line. In the second portion of extent 6 and in the third portion of extent 7, the transverse groove 4 is formed as extending in the course of its extent while forming an angle of inclination β with the axial direction A of the pneumatic vehicle tire. The angle α is in this case formed with 0°≤α≤20° and the angle β is formed with 0°≤β≤35° as the angle chosen. For example, they are chosen as α=15° and β=30°.

The transverse groove 4 is in this case formed with a constant orientation in the circumferential direction U from the groove wall 13 along its extent up to the circumferential groove 2.

In the region of the vertex point 8, the angle formed between the course of the groove base 10 in the first portion of extent 5 and in the second portion of extent 6 over the groove wall 11 is less than 180°.

The groove wall 11 forms at its intersection with the radially outer surface 9 an intersecting edge $S_1$. The groove wall 12 forms at its intersection with the radially outer surface 9 an intersecting edge $S_2$. In the region of the intersecting edge $S_1$, the first portion of extent 5 extends over a length of extent $L_1$, measured in the direction of extent of the transverse groove 4 in the first portion of extent 5, the second portion of extent extends over a length of extent $L_2$, measured in the direction of extent of the transverse groove 4 in the second portion of extent 6, and the third portion of extent extends over a length of extent $L_3$, measured in the direction of extent of the transverse groove 4 in the second portion of extent 6.

Along the extent of the intersecting edge $S_1$, the transverse groove 4 is formed with a width $b_1$, perpendicular to the direction of extent of the transverse groove 4 in the first portion of extent 5 in the radially outer surface 9, that is formed as continuously widened along the extent of the transverse groove 4 in the first region of extent 5 to the vertex point 8, and is taken further in the continuation in the second portion of extent 6 from the vertex point 8 with a continuously widened width $b_2$, measured perpendicularly to the direction of extent of the groove 4 in the second portion of extent 6. Consequently, the width b of the transverse groove 4 in the radially outer surface 9 increases continuously from the beginning of extent over its entire extent at the groove wall 13 in the first portion of extent 5 and second portion of extent 6. The intersecting edge $S_1$ is respectively formed as extending in a straight line in the first portion of extent 5 and in the second portion of extent 6. Similarly, the intersecting edge $S_2$ is formed as a straight line in the first portion of extent 5. The intersecting edge $S_2$ is also formed as a straight line in the second portion of extent 6 and in the third portion of extent 7, wherein it extends in a straight line from the vertex point 8 up to the circumferential groove 2. The intersecting edge $S_1$ extends from the vertex point 8 over the length of extent $L_2$ in a straight line up to a distance a from the circumferential groove 2, measured in the axial direction A, where the third portion of extent 7 begins.

In this case, the intersecting edge $S_1$ is formed in a first part of the third portion of extent 7 with a length of extent $L_{3a}$, measured in the direction of extent of the intersecting edge $S_1$ of the second portion of extent 6, as running in a straight line away from the intersecting edge $S_2$, while forming a vertex point, and following after that is redirected back again toward the intersecting edge $S_2$ and formed as running in a straight line over the length of extent $L_{3b}$ up to the circumferential groove 2. In this case, the width $b_3$, measured perpendicularly to the course of the intersecting edge $S_1$ in the second portion of extent 6, is also formed in each case as continuously increased along the extent of the transverse groove 4 in the direction of the circumferential groove 2 respectively in the portion of extent of the length of extent $L_{3a}$ and in the portion of extent $L_{3b}$ up to the circumferential groove. The increase in the width $b_3$ over the length of extent is in this case greater in the portion of the length of extent $L_{3a}$ than in the in the first portion of extent 5, the second portion of extent 6 and the region of extent of the length $L_{3b}$ adjoining the circumferential groove 2.

The intersecting edges $S_1$ and $S_2$ form along the extent of the transverse groove 4 in the first portion of extent 5, in the second portion of extent 6 and in the two sub-portions of the lengths $L_{3a}$ and $L_{3b}$ of the third portion of extent 7 in each case a v-shaped widening sectional contour of the transverse groove 4 in the radially outer surface 9.

Figure 3:
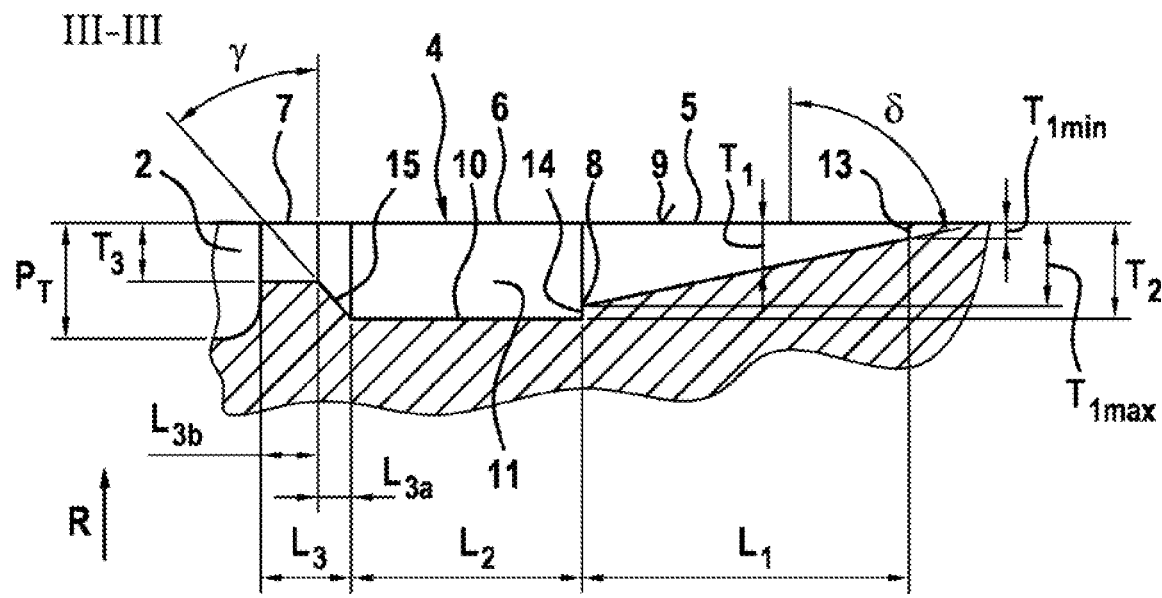
FIG. 3 shows a sectional representation of a transverse groove of the circumferential rib from FIG. 2 according to section from FIG. 2.
Figure 4:
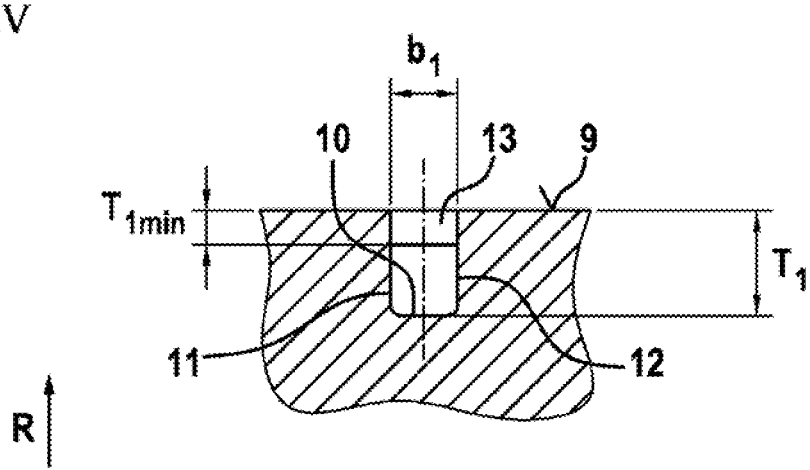
FIG. 4 shows the transverse groove from FIG. 3 in a sectional representation according to section IV-IV from FIG. 2.
Figure 5:
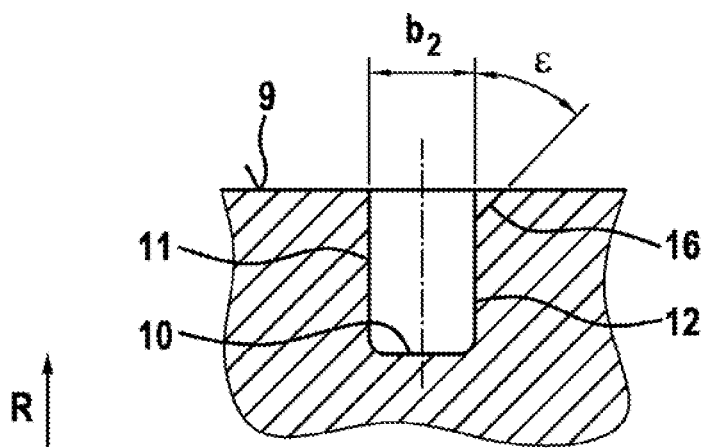
FIG. 5 shows the transverse groove from FIG. 3 in a sectional representation according to section V-V from FIG. 2.
Figure 6:
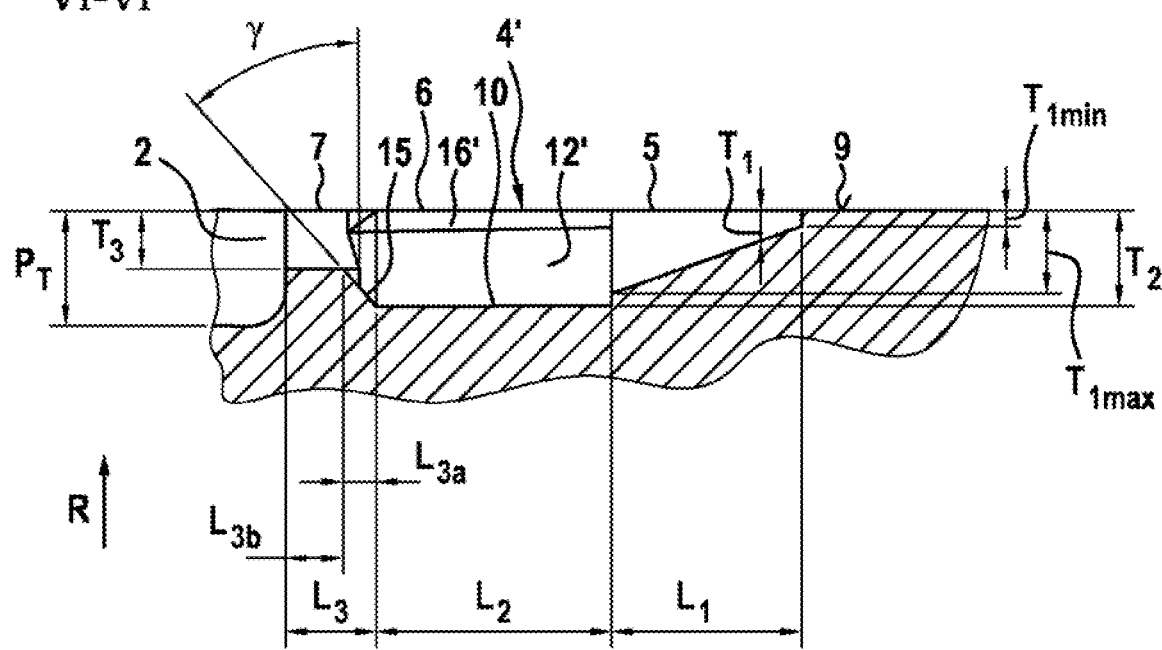
FIG. 6 shows an alternative formation of a transverse groove of the circumferential rib from FIG. 2 in a sectional representation according to section VI-VI from FIG. 2.
Figure 7:
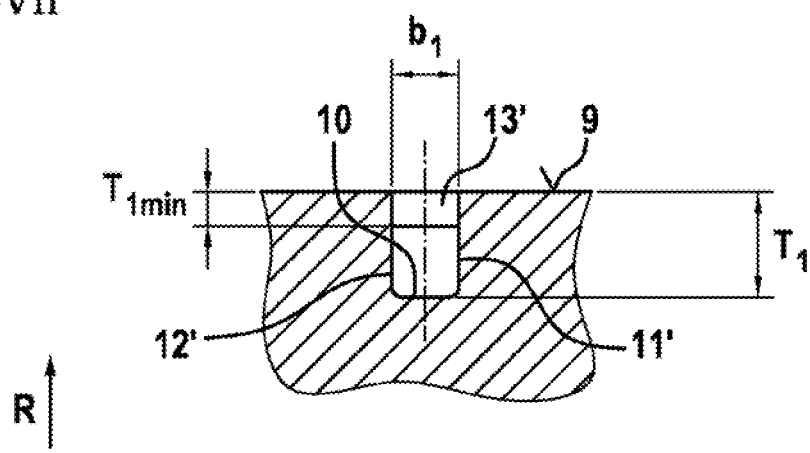
FIG. 7 shows the transverse groove from FIG. 6 in a sectional representation according to section VII-VII from FIG. 2; and, FIG. 8 shows the transverse groove from FIG. 6 in a sectional representation according to section VIII-VII from FIG. 2.
Figure 8:
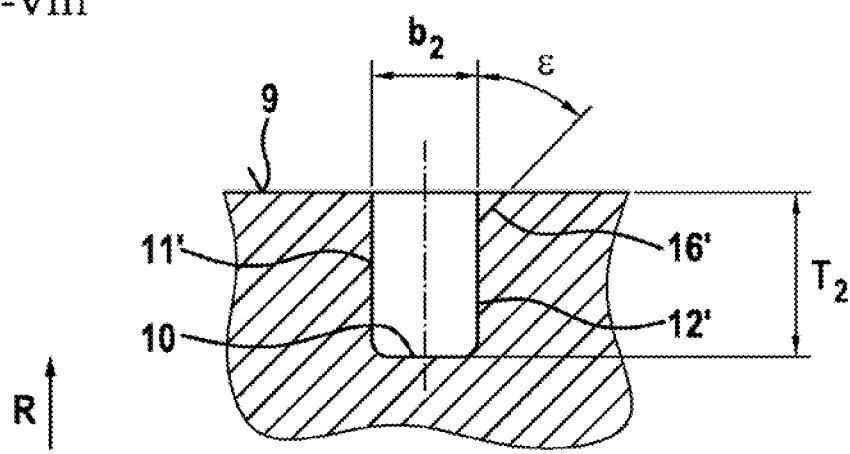

As represented in FIG. 3 and FIG. 4, the transverse groove 4 is formed in its first portion of extent 5 with a depth $T_1$, which starting from a minimum value of the depth $T_{1min}$, which it assumes at the position of the groove wall 13, increases continuously over the entire extent of the transverse groove 4 in the first portion of extent 5 up to the vertex point 8 to a maximum depth $T_{1max}$, which it reaches at the position of the vertex point 8. At the transition between the first portion of extent 5 and the second portion of extent 6 at the position of the vertex point 8, the groove base 10 is then lowered—as represented in FIG. 3—while forming a step 8 to a depth $T_2$, wherein, following after the step 8—as represented in FIG. 3 and FIG. 5—the transverse groove 4 is formed over its entire second portion of extent 6 with the depth $T_2$, where $T_2 \geq T_{1max}$. The step 8 is in this case dimensioned such that, for the difference $\Delta T=(T_2-T_{1max})$, it applies that: 0 mm≤ΔT≤3 mm. For example, the difference is formed as ΔT=1 mm.

At the transition between the second portion of extent 6 and the third portion of extent 7—as represented in FIG. 3—the groove base 10 is raised to a depth $T_3$ and extends with this depth $T_3$ up to the circumferential groove 2. The depth $T_3$ is formed with $T_3 > T_2$. In the portion of extent of the length $L_{3a}$ of the third portion of extent 7, the transition between the depth $T_2$ of the second portion of extent 6 and the depth $T_3$ is formed with the groove base 10 formed as a ramp 15.

The value of the minimum depth $T_{1min}$ is formed with 0 mm≤$T_{1min}$≤0.2 mm. The maximum value $T_{1max}$ is formed with 4 mm≤$T_{1max}$≤$P_T$. The profile depth $P_T$ is formed with 7 mm≤$P_T$≤8 mm.

The depth $T_2$ is formed with 7 mm≤$T_2$≤8 mm.

The depth $T_3$ is formed with 3 mm≤$T_3$≤5 mm as the chosen depth.

The width $b_1$ in the first portion of extent 5 is formed at the transition between the groove wall 13 and the groove wall 11 with its measured minimum width $b_{1min}$ where $b_{1min}$=1.5 mm and at the transition to the second portion of extent with its maximum width $b_{1max}$ where $b_{1max}$=3 mm. The width $b_2$ is formed with its maximum width $b_{2max}$ at the position of the groove wall 11 at the transition between the second portion of extent 6 and the third portion of extent 7 where $b_{2max}$=4 mm. The width $b_3$ of the first part of the third portion of extent 7 of the transverse groove 4 is formed at the transition between the first part of the third portion of extent 7, with the length of extent $L_{3a}$, and the second part of the third portion of extent 7, with the length of extent $L_{3b}$, with its maximum $b_{3max}$=5 mm. The width $b_4$, measured perpendicularly to the course of the extent of the second portion of extent 6, of the second part of the third portion of extent 7 of the transverse groove 4 is formed at the position of intersection between the groove wall 11 and the circumferential groove 4 with its maximum $b_{4max}$=5.5 mm.

The lengths of extent $L_1$, $L_2$, $L_3$ and $L_4$ are formed with 10 mm≤$L_1$≤15 mm, 10 mm≤$L_2$≤20 mm, $L_3$=5 mm and $L_4$=5 mm.

The axial distance a is formed with 8 mm≤a≤10 mm as the chosen distance.

FIGS. 2, 3, 4 and 5 also show a further embodiment in which there is formed along the second portion of extent 6 in the groove wall 12 at the transition of the groove wall 12 to the radially outer surface 9 a bevel 16, which is aligned in the sectional planes formed perpendicularly to the direction of extent of the transverse groove 4 in the second portion of extent 6 while forming an angle of inclination ε where ε=45° with the radial direction R. In the case of this embodiment, the intersecting edge $S_2$ is the intersecting edge with the radially outer surface 9 that is formed by extending the groove wall 12 in its radial extent outwardly up to the radially outer surface 9 and the width $b_2$ is the distance between this formed intersecting edge $S_2$ and the intersecting edge $S_1$.

FIGS. 1 and 2 also show another embodiment, with transverse grooves 4' that are formed in the circumferential rib 1 and are formed analogously to the formation of the transverse grooves 4 with the first portion of extent 5, second portion of extent 6 and third portion of extent 7 and their respective courses. The transverse grooves 4' are bounded on both sides of their groove base 10 in each case by flanks 11' and 12' and at the beginning of their extent by a groove wall 13'. Unlike in the case of the transverse groove 4, however, the transverse groove 4' has from the beginning of its extent at the groove wall 13' up to the circumferential groove 2 along its axial extent in its first portion of extent 5 a course of which the alignment in the circumferential direction U is oriented opposite to the alignment in the circumferential direction in the second and third portions of extent 6 and 7. Consequently, in this formation there is also included at the vertex point 8 a change in orientation of the course with regard to its circumferential alignment. In the embodiment represented in FIG. 2 it can be seen well that in the first portion of extent 5 of the transverse groove 4' up to the vertex point 8 the circumferential orientation in FIG. 5 is chosen as upward and in the second and third portions of extent 6 and 7 up to the circumferential groove 2 the circumferential orientation in FIG. 5 is chosen as downward. In this case—as can be seen in FIGS. 2, 6, 7 and 8—the transverse groove 4' is also formed in this configuration in the first portion of extent 5 with a depth $T_1$ increasing continuously up to the vertex point 8, then following after a step 14 in the second portion of extent 6 with a constant depth $T_2$ and in the third portion of extent 7 along a ramp 15 with a groove base 10 raised up to a depth $T_3$. It can similarly be seen that, also in the case of this formation, the width b of the groove 4' is increased continuously from the groove wall 13' along the entire axial extent of the transverse groove 4'.

FIGS. 1 and 2 show a further embodiment, in which transverse grooves 4 and transverse grooves 4' are arranged one behind the other in alternating sequence in the circumferential rib 1, distributed over the circumference. It can be seen in this case that the direction of extent of the transverse grooves 4 and 4' in the portion of extent between the circumferential groove 2 and the vertex point 8 is respectively formed as running substantially parallel.

It is understood that the foregoing description is that of the preferred embodiments of the invention and that various changes and modifications may be made thereto without departing from the spirit and scope of the invention as defined in the appended claims.

LIST OF REFERENCE NUMERALS

Part of the Description

1 Circumferential rib
2 Circumferential groove
3 Circumferential groove
4 Transverse groove
5 First portion of extent
6 Second portion of extent
7 Third portion of extent
8 Vertex point
9 Radially outer surface
10 Groove base
11 Groove wall
12 Groove wall
13 Groove wall
14 Step
15 Ramp
16 Bevel
31 Profile band
32 Profile band
33 Circumferential rib
34 Circumferential rib
35 Circumferential groove
36 Circumferential groove

The invention claimed is:

1. A tread profile of a pneumatic vehicle tire, the tread profile comprising:

at least one circumferential rib bounded outwardly in a radial direction R by a radially outer surface and in an axial direction A by a first circumferential groove and a second circumferential groove;

said radially outer surface forming a ground contact surface;

said at least one circumferential rib having transversely running transverse grooves formed therein;

wherein said transverse grooves extend in the axial direction A from a beginning of extent of the corresponding transverse groove, formed at an axial distance from said first circumferential groove and said second circumferential groove, in the direction of said first circumferential groove over a first portion of extent and over a second portion of extent, which adjoins said first portion of extent in the axial direction A, and said transverse grooves open into said first circumferential groove;

said transverse grooves each being formed with a width b, which is measured in said radially outer surface and increases along its entire extent between said beginning of extent and said first circumferential groove;

said transverse grooves being formed in the course of their extent between said first portion of extent and said second portion of extent with a vertex point;

said transverse grooves each defining a direction of extent;

said direction of extent of each of said transverse grooves from said beginning of extent along their extent in said first portion of extent to said vertex point being formed with a greater directional component in the circumferential direction U than in the axial direction A and from said vertex point over the entirety of said second portion of extent up to an opening into said first circumferential groove being formed with a greater directional component in the axial direction A than in the circumferential direction;

said transverse grooves being formed in said first portion of extent with a depth $T_1$, which is formed as increasing continuously from said beginning of extent along the extent over said first portion of extent up to reaching a maximum value $T_{1max}$ at said vertex point and being formed with a constant depth $T_2$ where $T_2 \geq T_{1max}$ in the second portion of extent.

2. The tread profile of claim 1, wherein:
said transverse grooves are formed along their extent up to said first circumferential groove following after said second portion of extent with a third portion of extent;
said third portion of extent extends up to said first circumferential groove;
said transverse grooves are formed with a constant depth $T_3$ in the third portion of extent; and,
wherein $T_2 > T_3$.

3. The tread profile of claim 2, wherein said transverse grooves are foamed along their extent in the direction of said first circumferential groove in said third portion of extent, following after said second portion of extent, with a v-shaped widened sectional contour in said radially outer surface and with a greater increase in its width than in said second portion of extent and said first portion of extent.

4. The tread profile of claim 1, wherein said transverse grooves are formed as extending in their first portion of extent with a direction of extent that forms an angle of inclination $\alpha$ with the circumferential direction U wherein $0° \leq \alpha \leq 20°$.

5. The tread profile of claim 1, wherein said transverse grooves are formed as extending in their portion of extent between said vertex point and said first circumferential groove with a direction of extent that forms an angle of inclination $\beta$ with the axial direction A, wherein $0° \leq \beta \leq 35°$.

6. The tread profile of claim 1, wherein said transverse grooves are formed along their extent in the direction of said first circumferential groove in said first portion of extent and said second portion of extent with a v-shaped widened sectional contour in said radially outer surface with a continuously increasing width.

7. The tread profile of claim 1, wherein:
said first portion of extent and said second portion of extent define a transition;
said transverse grooves each have a groove base; and,
said groove base is formed with a step, with an abrupt change in the groove depth from $T_{1max}$ to $T_2$ at said transition, wherein $0\ mm \leq (T_2 - T_{1max}) \leq 3\ mm$.

8. The tread profile of claim 1, wherein:
said transverse grooves include first transverse grooves which are formed with a constantly aligned circumferential orientation along their extent from said beginning of extent to said first circumferential groove and are formed in said circumferential rib.

9. The tread profile of claim 1, wherein:
said transverse grooves include second transverse grooves which are formed with a circumferential orientation changing at said vertex point along their extent from said beginning of extent to said first circumferential groove and are formed in said circumferential rib.

10. The tread profile of claim 8, wherein:
said transverse grooves include second transverse grooves which are formed with a circumferential orientation changing at said vertex point along their extent from said beginning of extent to said first circumferential groove and are formed in said circumferential rib.

11. The tread profile of claim 1, wherein the pneumatic vehicle tire is a pneumatic passenger car tire.

\* \* \* \* \*